(No Model.)

A. FELBER.
STOP MOTION FOR BUTTON HOLE SEWING MACHINES.

No. 275,622. Patented Apr. 10, 1883.

WITNESSES:
Francis McArdle.
C. Sedgwick

INVENTOR:
A. Felber
BY Munn & Co
ATTORNEYS.

UNITED STATES PATENT OFFICE.

ARTHUR FELBER, OF NYACK, NEW YORK.

STOP-MOTION FOR BUTTON-HOLE SEWING-MACHINES.

SPECIFICATION forming part of Letters Patent No. 275,622, dated April 10, 1883.

Application filed December 13, 1882. (No model.)

*To all whom it may concern:*

Be it known that I, ARTHUR FELBER, of Nyack, Rockland county, and State of New York, have invented a new and Improved Stop-Motion for Button-Hole Sewing-Machines, of which the following is a full, clear, and exact description.

My invention consists in an arrangement of automatic stop mechanism for button-hole sewing-machines, whereby after setting a machine in motion the operator may turn his attention to another machine for setting that in motion, leaving the first to stop itself when the button-hole is completed.

The present invention is an improvement upon the mechanism shown in Letters Patent granted to me November 14, 1882, No. 267,510, the object being to simplify the construction and to arrange the parts in such a manner that two machines can be stopped at once, thereby allowing a single operator to give attention to four machines.

Reference is to be had to the accompanying drawings, forming a part of this specification, in which similar letters of reference indicate corresponding parts in all the figures.

Figure 1:
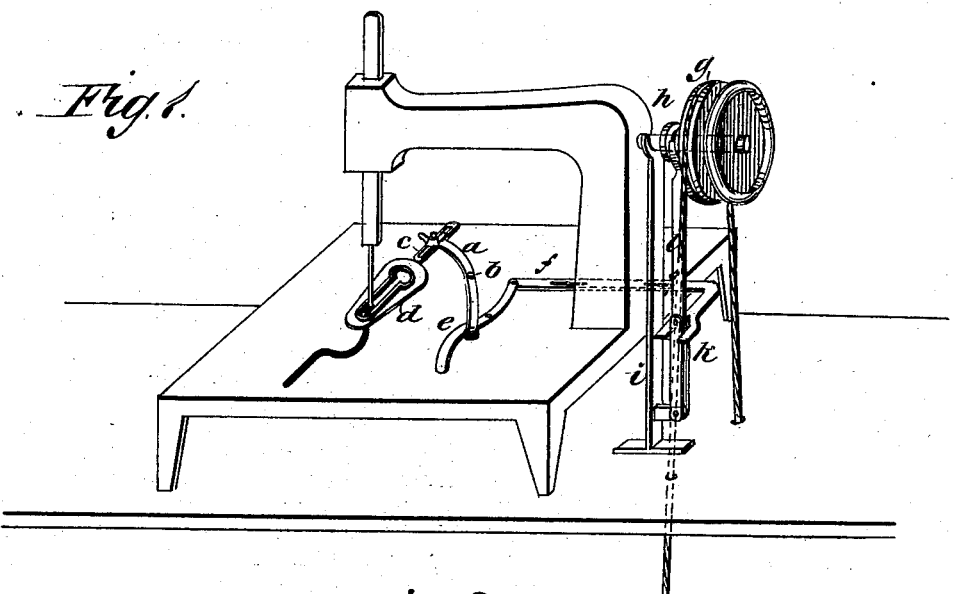
Figures 2, 3:
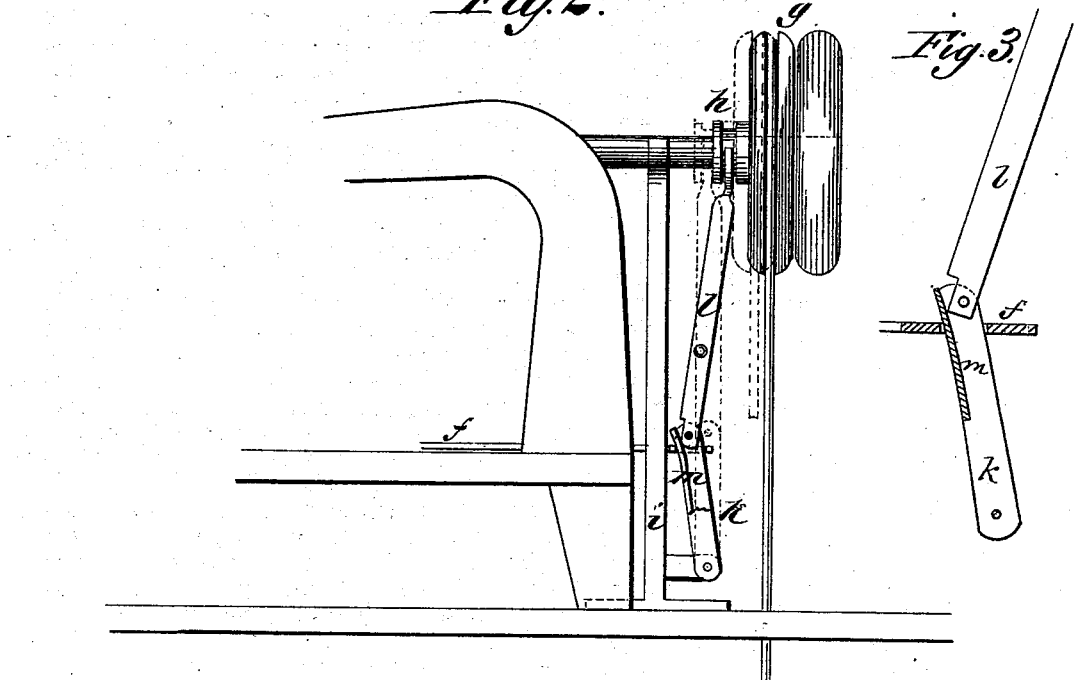

Figure 1 is a perspective view of a button-hole sewing-machine with my improved stop-motion applied thereto. Fig. 2 is a side view, and Fig. 3 is a detail side elevation of the toggle-arms which connect the sliding section of the clutch with the button-hole mechanism.

Upon the bed of the machine is a lever, $a$, pivoted at $b$, and provided at one end with an adjustable piece, $c$, for contact with the button-hole cam $d$. The other end of lever $a$ is provided with a roller that engages a lever, $e$, to which is connected a slide-rod, $f$, extending at the side of the machine.

Upon the shaft of the machine is a loose pulley, $g$, which will be connected by a belt to the main driving-shaft below, and upon the same shaft as the loose pulley is a sliding clutch, $h$, connected to the shaft by a feather, and formed for engagement with clutch-teeth on the side of the loose pulley.

Upon a fixed support, $i$, is jointed one end of a lever, $k$, and to the outer end of the lever $k$ an arm, $l$, is connected by a knuckle-joint, and the outer end of the arm $l$ is forked for engagement with the clutch $h$. The lever $k$ is provided with a spring, $m$, bearing upon the end of the arm $l$, so that the spring tends to retain the arm in line with the lever, but allows the arm to be bent in one direction. The arm or rod $f$ from the mechanism on the bed of the machine is shaped to bear upon the inner side of the lever $k$, or it may be forked for engagement therewith.

In operation, the machine being made ready to start, the lever $k$ and arm $l$ are moved by hand into the position shown in full lines, Fig. 2, which engages the clutch $h$ with the loose pulley $g$, and the machine is started. In this position the spring $m$ serves to retain the parts in the manner of a knife blade and handle; but as soon as the button-hole is completed, and the cam comes in contact with the end of the lever $a$, as shown in Fig. 1, the rod is given a movement outward sufficient to start the lever $k$ and arm $l$, so that the spring brings them into their straight-line position, and the clutch $h$ is thrown out of engagement and the machine stopped.

I use the peculiar form of mechanism shown in moving the clutch, so that no great amount of force is required in the movement of the rod $l$ to disconnect the parts, while the reverse movement for connecting the clutch being given by hand any amount of force can be used. This mechanism may be applied to a single machine; or, in case two machines are to be started and stopped at once, the lever $k$ or arm $l$ will be connected to similar devices upon a second machine, so that the cam of one machine will effect the stoppage of both, and in this manner the operator will be able to attend to four machines.

It will be understood that these devices are intended for use with machines run by power.

Having thus described my invention, I claim as new and desire to secure by Letters Patent—

1. In button-hole sewing-machines, the stop mechanism consisting of levers $a$ $e$, the rod $f$, the lever $k$, and spring-arm $l$, connected to a clutch on the shaft of the machine, substantially as shown and described.

2. In button-hole sewing-machines, the combination of the loose pulley $g$, the clutch $h$, the spring-toggle mechanism $k$ $l$ $m$, and rod $f$, fitted for movement, by the button-hole cam, substantially as described, for operation as set forth.

ARTHUR FELBER.

Witnesses:
GEO. D. WALKER,
EDGAR TATE.